(12) United States Patent
Pannatier et al.

(10) Patent No.: US 8,165,907 B2
(45) Date of Patent: Apr. 24, 2012

(54) SYSTEM AND METHOD FOR AUTOMATED RISK DETERMINATION AND/OR OPTIMIZATION OF THE SERVICE LIFE OF TECHNICAL FACILITIES

(75) Inventors: Yvan Pannatier, Zurich (CH); Andreas Maechler, Winterthur (CH); Tobias Muster, Pfaeffikon (CH)

(73) Assignee: Swiss Reinsurance Company Ltd., Zurich (CH)

( * ) Notice: Subject to any disclaimer, the term of this patent is extended or adjusted under 35 U.S.C. 154(b) by 1399 days.

(21) Appl. No.: 10/588,195

(22) PCT Filed: Dec. 7, 2004

(86) PCT No.: PCT/EP2004/053305
§ 371 (c)(1),
(2), (4) Date: Apr. 25, 2007

(87) PCT Pub. No.: WO2005/076170
PCT Pub. Date: Aug. 18, 2005

(65) Prior Publication Data
US 2008/0077457 A1 Mar. 27, 2008

(30) Foreign Application Priority Data
Feb. 3, 2004 (WO) ............... PCT/EP2004/050075

(51) Int. Cl.
*G06F 17/50* (2006.01)
(52) U.S. Cl. ..................................... 705/7.26
(58) Field of Classification Search ............. 705/7.28
See application file for complete search history.

(56) References Cited

U.S. PATENT DOCUMENTS

| 7,698,157 B2 * | 4/2010 | Ghouri .......................... 705/3 |
| 2003/0135399 A1 * | 7/2003 | Ahamparam et al. ......... 705/7 |
| 2004/0044617 A1 * | 3/2004 | Lu ................................. 705/38 |
| 2004/0117126 A1 * | 6/2004 | Fetterman et al. ........... 702/19 |
| 2005/0033678 A1 * | 2/2005 | Huneault ..................... 705/36 |
| 2005/0055249 A1 * | 3/2005 | Helitzer et al. ............... 705/4 |
| 2005/0075916 A1 * | 4/2005 | Lathram et al. ............... 705/7 |

FOREIGN PATENT DOCUMENTS

| FR | 2 808 909 | 11/2001 |
| WO | 00/70513 | 11/2000 |
| WO | WO 0070513 A1 * | 11/2000 |

OTHER PUBLICATIONS

Markowski, Adam S. "Quantitative Risk Assessment Improves Refinery Safety." Oil & Gas Journal, Sep. 9, 2022; 100, 37, ABI/INFORM Global, p. 56.*

(Continued)

*Primary Examiner* — Susanna M Meinecke Diaz
(74) *Attorney, Agent, or Firm* — Oblon, Spivak, McClelland, Maier & Neustadt, L.L.P.

(57) ABSTRACT

A device and a method for automated optimization of the service life of technical facilities and/or risk determination of technical facilities. Facility data is captured by a capture module of the optimization device and facility risks are optimized by an evaluation module of the optimization device based on the facility data. At least one risk analysis value for automated risk management and/or facility optimization value for automated optimization of at least one protection device or minimization of a danger potential of the technical facility are determined by corresponding risk elements and/or protection elements.

18 Claims, 3 Drawing Sheets

OTHER PUBLICATIONS

Figure 1:
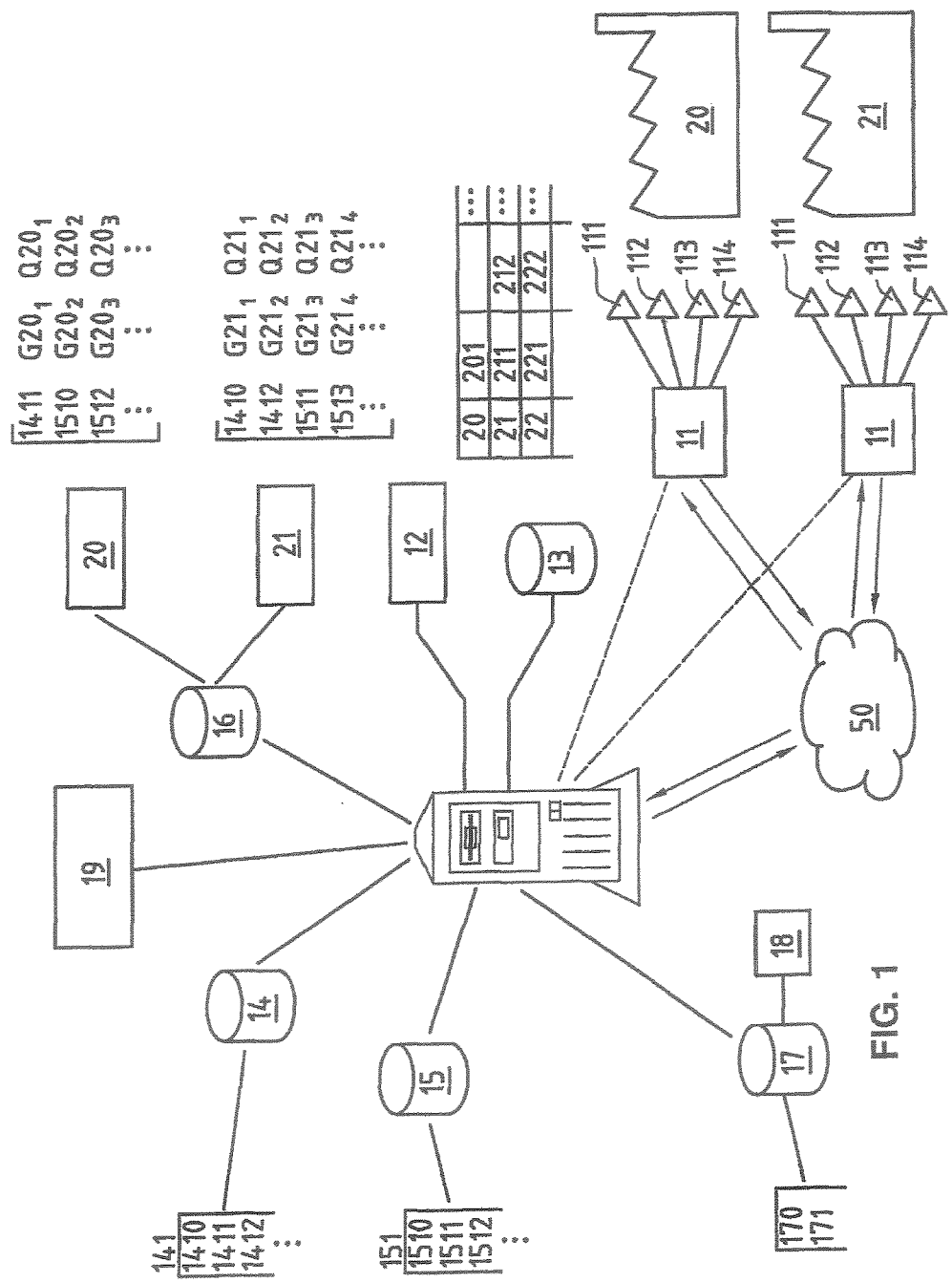

Hoof, Martin et al., "A Strategy for Advanced Condition Based Maintenance of Large Generators", Proceedings of The Electrical Electronics Insulation Conference and Electrical, IEEE, pp. 463-468, 2003.

Krieg, Terry et al., "Techniques and Experience in On-Line Transformer Condition Monitoring and Fault Diagnosis in ElectraNet SA", IEEE, pp. 1019-1024, 2000.

Mueller, Christian et al., "Beyond Mobile: Research Topics for upcoming Technologies in the Insurance Industry", Proceedings of the 36th Hawaii International Conference on System Sciences (HICSS'03), pp. 197-205, 2003.

Roemer, Michael J. et al., "Assessment of Data and Knowledge Fusion Strategies for Prognostics and Health Mangement[1]", IEEE, vol. 6, pp. 2979-2988, 2001.

* cited by examiner

SYSTEM AND METHOD FOR AUTOMATED RISK DETERMINATION AND/OR OPTIMIZATION OF THE SERVICE LIFE OF TECHNICAL FACILITIES

The invention relates to a device and a method for automated optimization of the service life of technical facilities and/or risk management and/or risk determination of technical facilities, wherein facility data are captured by means of a capture module of an optimization system and facility risks are optimized by means of an evaluation module of the optimization system on the basis of the facility data. In particular, the invention relates to an automated and/or computer-aided device and/or a corresponding method for risk management of portfolios of securities and/or insurance policies etc. in conjunction with technical facilities.

The service life of technical facilities is of great significance economically. On the one hand, the failure of a facility or parts of the facility mean a production failure and, on the other hand, this risk ties up production resources. In highly technical facilities, in particular, an increasing number of risk factors play an important role in view of a possible service interruption. Use, for example of computer technology or highly sensitive technical facility components especially, will complicate an evaluation, on the one hand, and, on the other hand, an optimization of the service life of the technical facility.

From the prior art, systems or automatic monitoring of facility elements and/or protection elements, for example, are known. The advantageous factor in such systems is that operating failures can be located and possibly corrected within a relatively short period The disadvantageous factor is that this system provides neither evaluation of the service life to be expected nor its optimization. In addition, such systems are exclusively suited to monitoring objective and quantitative detectable risk elements such as, for example, temperature, speed of a motor or the like.

In US publication 2003/004128 A1, a system for evaluating risks in an information system is described which makes it possible to calculate, for example a service life to be expected, by means of probabilities. The system has a capture module for capturing the risk data in a database and an evaluation module for calculating the total risk. The term risk is defined as a product of potential damage and the probability that this will happen. The disadvantageous factor in this known solution is that, for a comprehensive evaluation of the service life to be expected, quantities which cannot be objectively acquired also play a significant role which remain unconsidered in this known system. Furthermore, the determination of the potential damage and the probability that this will happen proves to be extremely difficult.

Another problem based on the difficulty of assessing technical facilities within one type of industry and across types of industry with respect to their risk of an operating failure etc. is known from the risk management of portfolios of securities or funds. Within a portfolio, the risk of individual securities should be mutually balanced as well as possible. The systems known in the prior art typically comprise assumptions and theories about the economic force and aims of the portfolio such as, e.g. high return of investment and/or low investor risk. For the calculation the system takes into consideration, e.g. business data and/or stock exchange data. This can include, for example, historical stock exchange data, balance sheet information and/or the profit shown. According to experience, however, financial analysts frequently change in the industry, with the consequence that the company strategy of the individual companies can change just as frequently and unpredictably. This can scarcely be taken into consideration with the systems of the prior art without requiring substantial intervention in the system every time.

It is an object of the present invention to propose a novel system and a method for automated risk management and/or automated optimization of the service life of technical facilities which do not have the above-mentioned disadvantages of the prior art. In particular, an automated, simple and efficient system and method are to be proposed which also reliably assess complex technical facilities by automated means. On the basis of this assessment, automated risk management of the technical facility and optimization of the protection devices and service life compared with other technical facilities should be possible. It is also an object of the invention to provide for an automated transparent and user-friendly risk management of a portfolio of securities based on technical facilities. This risk management should be able to adapt to changed conditions dynamically and by automated means.

According to the present invention, this object is achieved, in particular, by the elements of the independent claims. Other advantageous embodiments are also found in the dependent claims and the description.

In particular, these objects are achieved by the invention in that, for the purpose of automated optimization of the service life of technical facilities and/or risk determination or technical facilities, the device and/or the computer-aided system comprises a capture module for capturing facility data and an analysis module for analyzing the facility data and/or optimizing the service life of the facility, that the capture module comprises at least one measuring device and/or sensor, connected to the device via a network in a decentralized manner, with corresponding interfaces for determining one or more facility-specific quality factors, the measuring device and/or sensor being allocated to a particular technical facility, that the optimization device comprises a first database with predefined risk elements, wherein a risk instance and/or a risk potential of the technical facility can be detected in a quantified manner by means of a risk element, that the optimization device comprises a second database with predefined protection elements, wherein a protection device and/or a protection possibility of technical facilities can be detected in a quantified manner by means of a protection element, that at least one risk element and/or at least one protection element is stored allocated to the technical facility, wherein a facility-specific weighting factor can be determined for each risk element and protection element, which weighting factor comprises the relative weighting ratio of the risk elements and/or protection elements with respect to one another that a facility-specific quality factor can be determined for each risk element and protection element by means of the at least one measuring device and/or sensor, wherein the quality factor comprises the instantaneous facility-specific instance of a technical risk element or protection element on the basis of the measured facility data, and that the optimization device comprises an evaluation module for determining risk analysis values and/or facility optimization values on the basis of the sum of the products of the risk elements with associated weighting factors and quality factors combined with the sum of the products of the protection elements with associated weighting factors and quality factors. This variant of an embodiment has the advantage, among other things, that technical facilities can be optimized and/or monitored and compared by automated means. This relates both to a possible service life and to security and/or risks of operating the facility. By means of a comparison, the facilities can also be optimized with respect to other factors. This includes, e.g. risk minimization/required investment with respect to insurances policies, share prices etc. Using the method, the comparison can be made by automated means on the basis of current operating data which is not possible in any way with other devices and systems of the prior art. The system and method also have the advantage that it [lacuna] automated administration of securities and/or insurance policies portfolios etc. which is always up-to-date, including data which are not only based on balance sheet and stock exchange data of the companies. In particular, short-term changes in management and/or leadership of the companies are also taken into consideration automatically.

In one variant of an embodiment, at least two types of facility risk are generated and stored in a memory module of the optimization system, wherein the types of facility risk in each case comprise at least one risk element and/or one protection element and one type of facility risk can be allocated to each technical facility, and for each type of facility risk, a reference value is generated, wherein the facility data of different technical facilities are normalized to the reference value of the associated type of facility risk by means of a normalization module. As a variant of the embodiment, the types of facility risk can be preferably generated in such a manner that a technical facility can always unambiguously be allocated to in each case one type of facility risk. This variant of the embodiment has the advantage, among other things, that different technical facilities can be compared with one another in a normalized manner. On the one hand, this allows improved and up-to-date assessment of the technical facilities with respect to one another. In addition, portfolios can be balanced out with respect to their risk on the basis of the current state of the facilities.

In another variant of an embodiment, the types of facility risk and/or the associated reference values are generated dynamically. This variant of an embodiment has the advantage, among other things, that the types of facility risk and/or the associated reference values can be obtained as up-to-date as possible at all which allows quick response to short-term changes. This is achieved, in particular, without generating additional work, time and/or cost expenditure.

In a further variant of an embodiment, a two-dimensional matrix table is generated and stored in accordance with the combination, in which table a first dimension is allocated to the protection level of a technical facility and a second dimension is allocated to the risk level of a technical facility. For the automated risk management and/or automated optimization of the service life of the technical facility, the sum of the products of the protection elements with associated weighting factors and quality factors of the technical facility will be eroded in accordance with the first dimension and the sum of the products of the risk elements with associated weighting factors and quality factors of the technical facility will be entered in accordance with the second dimension, and the at least one risk analysis value and/or facility optimization value is determined on the basis of the location of the entry in the matrix table. In a variant of an embodiment, the matrix table can be divided into predefinable sectors, a sector corresponding to at least one definable risk analysis value and/or facility optimization value. This variant of an embodiment has the advantage, among other things, that it allows simple and quick assessment or evaluation of the technical facility. This method also simplifies the evaluation of changes made with respect to its effectiveness in comparison with other technical facilities.

In another variant of an embodiment, the matrix table is normalized by means of a facility-risk-specific normalization factor for determining the risk analysis values and/or facility optimization values for a technical facility. The facility-risk-specific normalization factor can be generated dynamically on the basis of available facility data of technical facilities of the corresponding type of facility risk. This variant of an embodiment has the advantage, among other things, that technical facilities can be compared with one another independently of their type of facility risk. Thus, e.g. portfolios of securities and/or portfolios of insurance policies etc. can be optimized or minimized, respectively via different types of facility risk with respect to their facility risk and/or return of investment.

In one variant of an embodiment, the scale of the first and/or second dimension of the matrix table is linearly selectable. This variant of an embodiment has the advantage, among other things, that dependences can be detected and represented in a simple manner.

In another variant of an embodiment, the scale of the first and/or second dimension of the matrix table can be nonlinearly selected. This variant of an embodiment has the advantage, among other things, that complex nonlinear dependencies can also be detected and represented in a simple manner. This simplifies the assessment of the technical facilities or portfolios. In addition, this simplifies and accelerates possible optimization of the technical facility or of the portfolios.

In one variant of an embodiment, the risk analysis values and/or facility optimization values for possible combinations and weightings of the protection elements and/or risk elements are automatically generated, and stored accessible to a user, by means of an extrapolation module. This variant of an embodiment has the advantage, among other things, that local and/or global optimizations can be performed by automated means by means of the extrapolation module. In particular/such optimizations can be supplemented by one or more neural network units of the extrapolation module.

In one variant of an embodiment, a group risk factor is allocated to each type of facility risk by means of the evaluation module, the group risk factor comprising the overall risk of all technical facilities of a type of facility risk. This variant of an embodiment has the advantage, among other things, that types of facility risk can be compared across types and technical facilities can be correspondingly optimized or, e.g., insurance policies can also be calculated.

In another variant of an embodiment, the group risk factor is generated dynamically by means of an evaluation module The group risk factor can be generated, e.g. on the basis of facility data. This can be generated, for example, once or periodically. This variant of an embodiment has the advantage, among other things, that the group risk factor can be obtained as up-to-date as possible at all which allows quick response to short-term changes. In particular, this is achieved without generating additional work, time and/or cost expenditure.

In one variant of an embodiment, the capture module is arranged accessibly in a decentralized manner via a network. This variant of an embodiment has the advantage, among other things, that the system and/or the method can be provided by corresponding service providers without each technical facility being able to comprise the entire system. This has the advantages, among other things, that cost and/or time expenditure can be optimized or reduced, respectively.

In another variant of an embodiment, groups of protection elements are formed by means of evaluation module with one or more protection elements as knock-out protection elements, so-called red flags, wherein a knock-out protection element determines the behavior of the entire [lacuna] if a given limit value of the knock-out protection element is reached. This has the advantage, among other things, that mutual dependencies of risk elements and/or protection elements can be detected and correspondingly taken into consideration in the system and/or method.

It should be noted at this point that the present invention is based, apart from the method according to the invention, also on a device and a computer-aided system for carrying out this method. Furthermore, it is not restricted to the system and method mentioned but also relates to a computer program product for implementing the method according to the invention and a corresponding portfolio management system.

In the text which follows, variants of embodiments of the present invention are described with reference to examples. The examples of the embodiments are illustrated by the following figures attached:

FIG. 1 shows a block diagram which diagrammatically illustrates the architecture of a system according to the invention for automated risk management and/or automated optimization of the service life of technical facilities.

Figure 2:
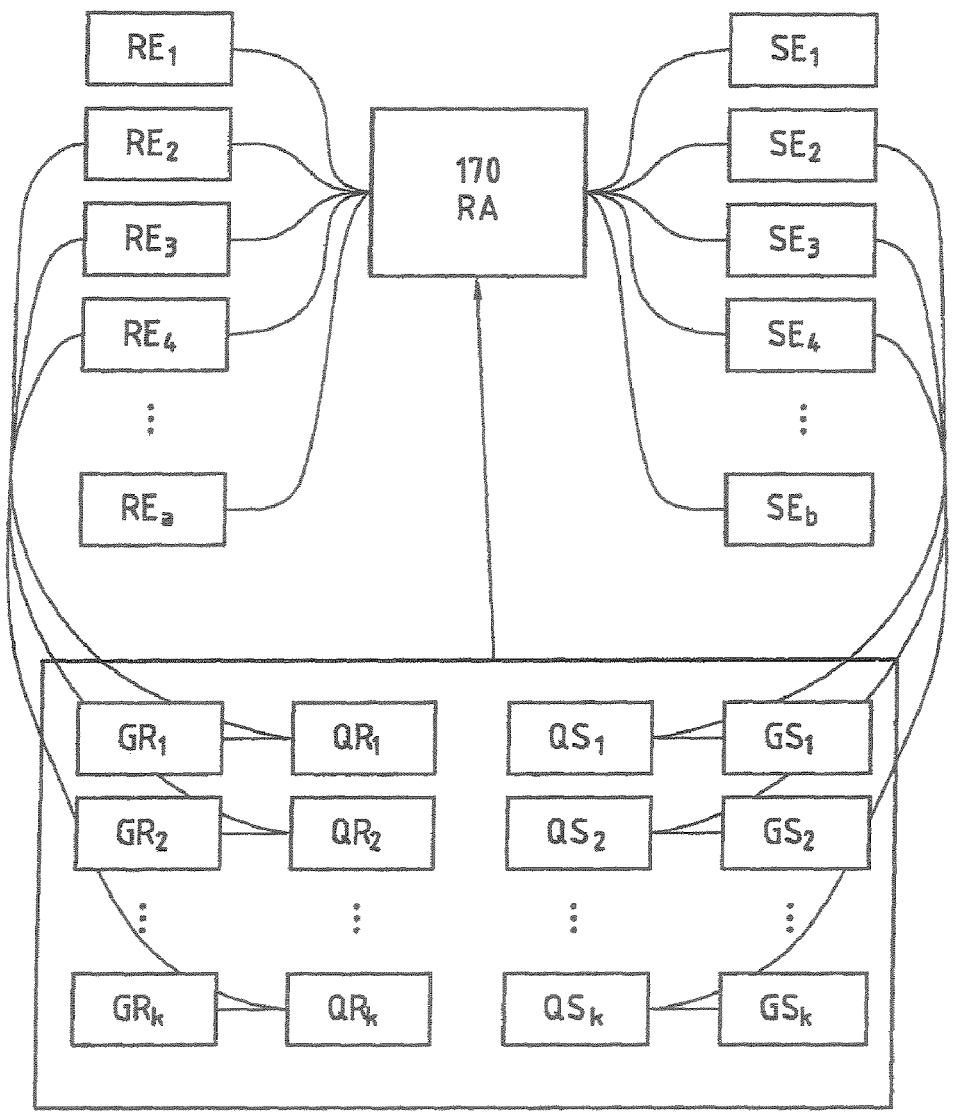

FIG. 2 diagrammatically illustrates the architecture of a part of the optimization system 10 according to the invention, wherein a type of facility risk RA comprises one or more risk elements $RE_i$ and/or one or more protection elements $SE_i$ and a weighting factor $GR_i$ and $GS_i$ and a quality factor $QR_1$ and $QS_i$ is stored allocated to each $RE_i$ and $SE_i$, respectively.

Figure 3:
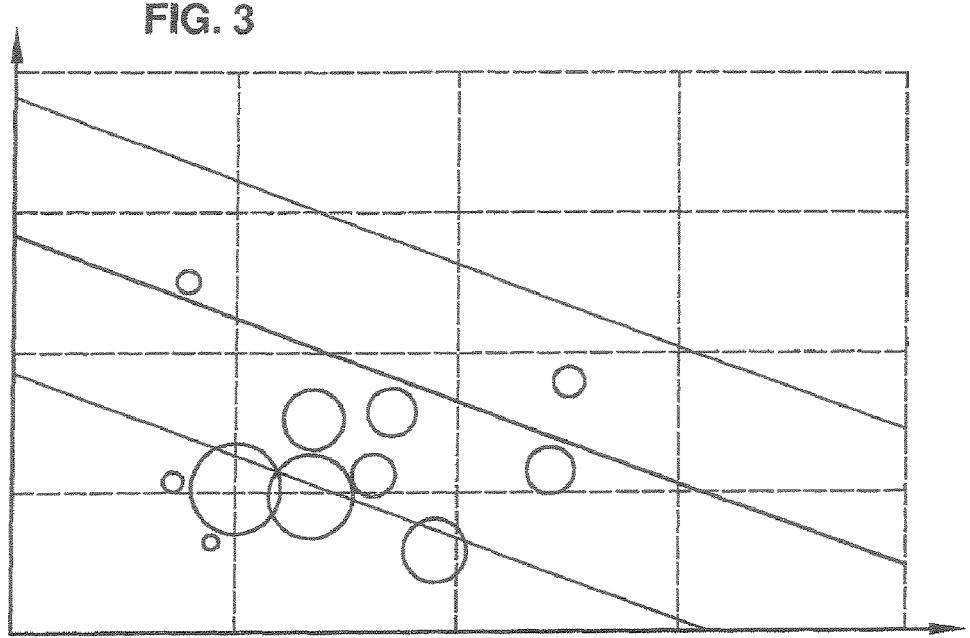

FIG. 3 shows a diagram which diagrammatically reproduces the operation of the matrix table in which a first dimension is allocated to the protection level of a technical facility 20, 21 and a second dimension is allocated to the risk level of a technical facility 20, 21.

Figure 4:
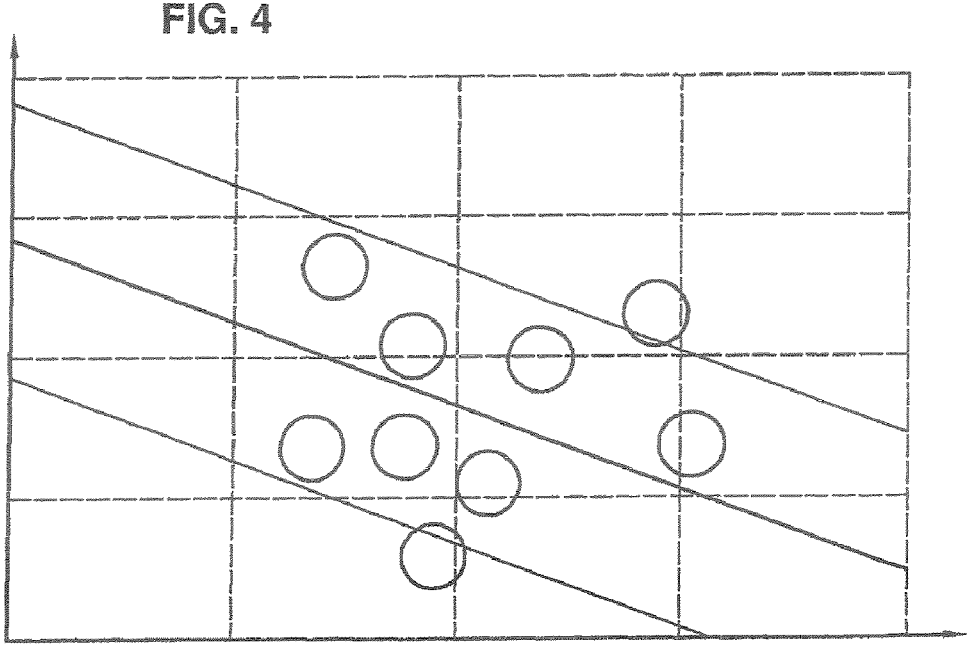

FIG. 4 also shows a diagram which diagrammatically reproduces the operation of the matrix table, wherein for example for the purpose of portfolio management, protection devices and facility risk of different facilities are arranged distributed around a reference value in order to minimize the risk of the portfolio.

FIG. 1 diagrammatically illustrates an architecture which can be used for implementing the invention. In this exemplary embodiment, facility data 201, 202, 211, 212 are captured by means of a capture module 11 of an optimization system 10 for the purpose of automated risk management and/or automated optimization of the service life of technical facilities 20, 21. By means of the facility data 201, 202, 211, 212, facility risks will be optimized by means of an evaluation module 12 of the optimization system 10 on the basis of the facility data 201, 202, 211-212. Capture module 11 and evaluation module 12 can be constructed as hardware and/or software, e.g., by suitable means. The optimization system 10 generates a list 141 with risk elements 1410, 1411, 1412 and stores them in a first database 14. A risk instance and/or a risk potential of technical facilities 20, 21 can be captured in a quantified manner by means of a risk element 1410, 1411, 1412. Risk instance and/or risk potential of technical facilities 20, 21 are, e.g. fire hazard, closeness to water, earthquake hazard, susceptibility to wear and/or tear etc. etc. For example, risk elements can also be captured on the basis of corresponding groups. Examples of this would be, among other things, environmental hazards such as the immediate or indirect neighborhood of the technical facility, earthquakes, flooding, drought, hurricanes, etc., design-related risks such as building construction, arrangement of the technical facilities in the buildings, electrical and/or sanitary installations etc., process risks such as heat-dependence (fire etc.), process hazards, sensitivity to smoke and other contamination, age of the facility. The optimization system 10 generates a list 151 with protection elements 1510, 1511, 1512 and stores them in a second database 15. A protection device and/or a protection possibility of technical facilities 20, 21 can be detected in a quantified manner by means of a protection element 1510, 1511, 1512. Protection possibilities and/or protection devices include, e.g. fire alarm, number of available fire extinguishers, water sprinkling systems for fighting fire, distance from the nearest fire department but also maintenance expenditure invested, corporate culture and care etc. etc. The protection elements can also be covered, e.g. in groups such as, e.g. prevention measures such as water supply, availability and accessibility by the fire department, fire detection devices, fire extinction devices etc. or administrative measures such as maintenance of the facility, frequency of inspections, training of staff members, risk management applied etc.

At least one risk element 1410, 1411, 1412 and/or protection element 1510, 1511, 1512 is stored allocated to the technical facility 20. For each risk element 1410, 1411, 1412 and protection element 1510, 1511, 1512 allocated, a facility-specific weighting factor $G20_1$, $G20_2$, $G21_1$, $G21_2$ is determined by means of the optimization system 10. The weighting factor $G20_1$, $G20_2$, $G21_1$, $G21_2$ comprises the relative weighting ratio of the risk elements 1410, 1411, 1412 and/or protection elements 1510, 1511, 1512 with respect to one another. For each risk element 1410, 1411, 1412 and protection element 1510, 1511, 1512, a facility-specific quality factor $Q20_1$, $Q20_2$, $Q21_1$, $Q21_2$ is determined by the capture module 11 via corresponding interfaces by means of a respective measuring and/or capture device 111, 112, 113, 114. The measuring devices and/or capture devices 111 112, 113, 114 can be connected to the capture module 11 unidirectionally and/or bidirectionally directly or via a network. The measuring devices and/or capture devices 111, 112, 113, 114 can comprise corresponding sensors and/or input elements, particularly also manual input elements such as, e.g. keyboard, mouse pad etc. If the connection between the measuring devices and/or the capture devices 111 112, 113, 114 and the capture module 11 is effected via a network, the network can comprise, for example, a GSM or an UMTS network, or a satellite-based mobile radio network, and/or one or more landline networks, for example the public switched telephone network, the worldwide Internet or a suitable LAN (local area network) or WAN (wide area network). In particular, it also comprises ISDN and XDSL connections.

The quality factor $Q20_1$, $Q20_2$, $Q21_1$, $Q21_2$ comprises the facility-specific instance of a risk element 1410, 1411, 1412 or protection element 1510, 1511, 1512 based on the measured facility data 201, 202, 211, 212. On the basis of the sum of the products of the risk elements 1410, 1411, 1412 with associated weighting factors $G20_1$, $G20_2$, $G21_1$, $G21_2$ and quality factors $Q20_1$, $Q20_2$, $Q21_1$, $Q21_2$, combined with the sum of the products of the protection elements 1510, 1511, 1512 with associated weighting factors $G20_1$, $G20_2$, $G21_1$, $G21_2$ and quality factors $Q20_1$, $Q20_2$, $Q21_1$, $Q21_2$, the evaluation module 12 determines at least one risk analysis value for the automated risk management and/or facility optimization value for the automated optimization of at least one protection device or minimization of a risk potential of the technical facility.

As a variant of an embodiment, the optimization system can generate, and store in a memory module 17 of the optimization system 10, at least two facility risk types 170, 171. The facility risk types 170, 171 in each case comprise at least one risk element 1410, 1411, 1412 and/or one protection element 1510, 1511, 1512, wherein each technical facility 20, 21 can be allocated to one facility risk type 170, 171. FIG. 2 diagrammatically illustrates a facility risk type RA which comprises one or more risk elements $RE_1$ and/or one or more protection elements $SE_1$ and a weighting factor $GR_i$ and $GS_i$ and a quality factor $QR_i$ and $QS_i$ is stored allocated to each $RE_i$ and $SE_i$, respectively. It can be advantageous if the facility risk types are generated in such a manner that the allocation to a technical facility is unambiguous. For each facility risk type 170, 171, one reference value is generated and the facility data 201, 202, 211, 212 of different technical facilities 20, 21 are normalized by means of a normalization module 18 on the basis of the reference value of the allocated facility risk type 170, 171. The facility risk types 170, 171 and/or the associated reference values can be generated, for example, dynamically. This means that the different facility risk types can thus be normalized at any time on the basis of up-to-date values since the most up-to-date data for the technical facilities 20, 21 are available at any time with the capture modules 11. To combine the sum of the products of the risk elements 1410, 1411, 1412 with associated weighting factors $G20_1$, $G20_2$, $G21_1$, $G21_2$ and quality factors $Q20_1$, $Q20_2$, $Q21_1$, $Q21_2$ with the sum of the products of the protection elements 1510, 1511, 1512 with associated weighting factors $G20_1$, $G20_2$, $G21_1$, $G21_2$ and quality factors $Q20_1$, $Q20_2$, $Q21_1$, $Q21_2$, a two-dimensional matrix table, for example, can be generated and stored in which a first dimension is allocated to the protection level (sum of the products of the protection elements 1510, 1511, 1512 with associated weighting factors $G20_1$, $G20_2$, $G21_1$, $G21_2$ and quality factors $Q20_1$, $Q20_2$, $Q21_1$, $Q21_2$) of a technical facility 20, 21 and a second dimension is allocated to the risk level (sum of the products of the risk elements 1410, 1411, 1412 with associated weighting factors $G20_1$, $G20_2$, $G21_1$, $G21_2$ and quality factors $Q20_1$, $Q20_2$, $Q21_1$, $Q21_2$) of a technical facility 20, 21 (FIG. 3/4). For the automated risk management and/or automated optimization of the service life of the technical facility 20, 21, the sum of the products of the protection elements 1510, 1511, 1512 with associated weighting factors $G20_1$, $G20_2$, $G21_1$, $G21_2$ and quality factors $Q20_1$, $Q20_2$, $Q21_1$, $Q21_2$ of the technical facility 20, 21 is transferred in the first dimension and the sum of the products of the risk elements 1410, 1411, 1412 with associated weighting factors $G20_1$, $G20_2$, $G21_1$, $G21_2$ and quality factors $Q20_1$, $Q20_2$, $Q21_1$, $Q21_2$ of the technical facility 20, 21 is transferred in the second dimension. The at least one risk analysis value and/or the at least one facility optimization value are determined on the basis of the location of the entry in the matrix table. The matrix table can be divided, e.g. into predefinable sectors (FIG. 3/4), wherein one sector corresponds to at least one definable risk analysis value and/or facility optimization value. The matrix table can be normalized by means of a facility-risk-type-specific normalization factor, e.g. for determining the risk analysis values and/or facility optimization values for a technical facility 20, 21. The facility-risk-specific normalization factor can be generated dynamically on the basis of available facility data of technical facilities 20, 21 of the corresponding facility risk type 170, 171. The dynamic generation provides for, e.g. a normalization of the matrix table which is up-to-date at any time as a result of which even subtle changes in the corporate culture and/or management of the technical facilities 20, 21 can also be taken into consideration. The scale of the first and/or second dimension of the matrix table can be selectable, e.g. linearly or nonlinearly. As a result, even complex nonlinear processes but also simple linear dependencies can also be taken into consideration depending on the risk type of the industry. As a special variant of an embodiment, it may be appropriate to select an identical matrix table for all industry types measured. By means of the matrix table it is easily possible for a user, for example, to optimize a technical facility 20, 21 with respect to its protection elements and/or risk elements, and/or to adapt it to a general standard. The latter may be of significance, e.g. during the automatic determination of insurance premiums. In addition, the user can use the matrix table to balance and/or adapt his portfolio in simple manner, e.g. with respect to investment risk in the case of risk management for portfolios of securities. FIG. 4 shows such a balanced and/or adapted distribution and FIG. 3 shows an unbalanced distribution within the matrix table.

As an extension, the risk analysis values and/or facility optimization values for possible combinations and weightings of the protection elements 1510, 1511, 1512 and/or risk elements 1410, 1411, 1412 can be automatically generated and stored accessible to a user, e.g. by means of an extrapolation module 19. The extrapolation module 19 can be used for optimizing, e.g. the protection elements and/or risk elements by automatic means in that the extrapolation module 19 looks for a corresponding local or global extreme and indicates it to the user. For this purpose, other factors and/or boundary conditions can also be taken into consideration by the extrapolation module 19, such as, for example, time factors and/or financial aspects such as, e.g. the required investment in order to achieve such optimization of the technical facility 20, 21. It may also be appropriate if a group risk factor is allocated to each facility risk type 170, 171 by means of the evaluation module 12, wherein the group risk factor comprises the overall risk of all technical facilities of a facility risk type 170, 171. In this variation of an embodiment, too, it may be advantageous for particular applications that the group risk factor is generated dynamically by means of the evaluation module 12. This can be achieved on the basis of the facility data of the capture modules 11 and/or other up-to-date data such as, e.g. Internet enquiries or enquiries from networked status databases of the technical facilities 20, 21.

It is of importance to point out that, naturally, the capture module 11 can be arranged to be accessible centrally and/or decentralized via a network 50 in the optimization system 10. In the latter possibility, the system 10 can also be offered as network service, i.e., e.g. as Internet service by a service provider for operators of technical facilities 20, 21. The communication network 50 can comprise, for example, a GSM or an UMTS network, or a satellite-based mobile radio network and/or one or more landline networks, for example the public switched telephone network, the worldwide Internet or a suitable LAN (local area network) or WAN (wide area network). In particular, it also comprises ISDN and XDSL connections. Corresponding enquiries can also be made by a user, e.g. by means of a communication terminal via the network 50. In this process, data such as texts, graphics, images, maps, animations, moving pictures, video, QuickTime, sound recordings, programs (software), program-accompanying data and hyperlinks or references to multimedia data can be used for communication. This includes, e.g. also MPx (MP3) or MPEGx (MPEG4 or 7) standards as defined by the Moving Picture Experts Group. In particular, the multimedia data can comprise data in the HTML (hyper text markup language), HDML (handheld device markup language), WMD (wireless markup language), VRML (virtual reality modeling language or XML (extensible markup language, format. The communication terminal of the user can be, for example, a PC (personal computer), TV, PDA (personal digital assistant) or a mobile radio device (particularly e.g. in combination with a broadcast receiver). The possibility of an enquiry by the user made at any time may be appropriate, particularly for portfolio management, so that he can respond rapidly and reliably, e.g. to changed risk conditions.

Finally, it may also be appropriate that groups of protection elements 1510, 1511, 1512 are formed as knock-out protection elements with one or more protection elements 1510, 1511, 1512 by means of the evaluation module 12. A knock-out protection element determines and/or dominates the behavior or the influence of the entire group with respect to the evaluation of the optimization system 10 when a given limit value of the knock-out protection element is reached. For example, the availability of fire extinction water and the distance from the nearest local fire department can be defined as protection elements for a specific technical facility 20, 21. If, in contrast, there is no fire extinction water, this factor directly also influences the functioning of the protection element "fire department". Such dependences, e.g., can also be taken into consideration additionally by means of knock-out protection elements.

The invention claimed is:

1. An optimization system for automated optimization of a service life of technical facilities and/or risk determination of technical facilities, comprising:
   an optimization device that includes an analysis module configured to analyze facility data to optimize the service life of a technical facility;
   a capture module configured to capture the facility data of the technical facility, the capture module including at least one measuring device having at least one sensor, connected to the optimization device via a network, with corresponding interfaces for determining one or more facility-specific quality factors, the at least one measuring device being allocated to a particular technical facility;
   a first database configured to store predefined risk elements, identifying in a quantified manner a risk instance and/or a risk potential of the technical facility;
   a second database configured to store predefined protection elements, identifying in a quantified manner a protection device and/or a protection possibility of technical facilities;
   a third database configured to store, for each technical facility, at least one risk element and/or at least one protection element allocated to the technical facility, a facility-specific weighting factor determined for each risk element and protection element, and a facility-specific quality factor, determined by the capture module via the at least one measuring device, for each risk element and protection element, the facility-specific weighting factor identifying the relative weighting ratio of the risk elements and/or protection elements with respect to one another, the facility-specific quality factor identifying an instantaneous facility-specific instance of a risk element or protection element based on the measured facility data; and
   an evaluation module configured to determine risk analysis values and/or facility optimization values based on the sum of the products of the risk elements with associated facility-specific weighting factors and facility-specific quality factors as well as the sum of the products of the protection elements with associated facility-specific weighting factors and facility-specific quality factors,
   wherein the evaluation module is implemented as hardware or as a hardware/software combination;
   wherein the optimization device is configured to generate and store a two-dimensional table in accordance with a combination, a first dimension of the two-dimensional table identifying a protection level of a technical facility and a second dimension of the two-dimensional table identifying a risk level of a technical facility;
   wherein the optimization device is configured to populate the two-dimensional table, for automated risk management and/or for automated optimization of the service life of the technical facility, with the sum of the products of the protection elements with associated facility-specific weighting factors and facility-specific quality factors of the technical facility in relation to the first dimension, to populate the two-dimensional table with the sum of the products of the risk elements with associated weighting factors and quality factors of the technical facility in relation to the second dimension, and to determine that the at least one risk analysis value and/or facility optimization value on the basis of location of an entry in the two-dimensional table;
   wherein the two-dimensional table is normalized by a facility-risk-specific normalization factor for determining the risk analysis values and/or facility optimization values for a technical facility.

2. The system as claimed in claim 1, further comprising:
   a memory module configured to store a plurality of facility risk types having at least one risk element and/or one protection factor
   a normalization module configured to automatically generate a facility-risk-type-specific reference value,
   wherein
      each technical facility is allocated to one facility risk type, and
      the facility data of different technical facilities are normalized based on the reference value of the associated facility risk type by the normalization module.

3. The system as claimed in claim 1, further comprising:
   an extrapolation module configured to automatically generate the risk analysis values and/or optimization data for possible combinations and weightings of the protection elements and/or risk elements.

4. The system as claimed in claim 1, wherein a group risk factor is allocated to each facility risk type, the group risk factor being calculated by the evaluation module and identifying an overall risk of all technical facilities of a facility risk type.

5. The system as claimed in claim 1, wherein the capture module is further configured to be accessible via a decentralized network.

6. A method for automated risk management and/or automated optimization of a service life of technical facilities, comprising:
   capturing, via a capture module of an optimization device, facility data of a technical facility;
   generating and storing, in a first database, a list with risk elements identifying a risk instance and/or a risk potential of technical facilities in a quantified manner;
   generating and storing, in a second database, a list with protection elements identifying a protection device and/or a protection possibility of technical facilities in a quantified manner;
   storing, in a third database and for each technical facility, at least one risk element and/or protection element allocated to the technical facility, a facility-specific weighting factor being determined for each risk element and protection element, and a facility-specific quality factor determined by the capture module via a measuring and/or capturing device, the facility-specific weighting factor identifying the relative weighting ratio of the risk elements and/or protection elements with respect to one another, the facility-specific quality factor identifying a facility-specific instance of a risk element or protection element based on the measured facility data; and
   determining, via the evaluation module, based on the sum of the products of the risk elements with associated facility-specific weighting factors and facility-specific quality factors as well as the sum of the products of the protection elements with associated facility-specific weighting factors and facility-specific quality factors, at least one risk analysis value for automated risk management, one facility optimization value for automated optimization of at least one protection device and/or minimization of a risk potential of the technical facility;

generating and storing a two-dimensional table in accordance with a combination, a first dimension of the two-dimensional table identifying a protection level of a technical facility and a second dimension of the two-dimensional table identifying a risk level of a technical facility;

populating the two-dimensional table, for automated risk management and/or for automated optimization of the service life of the technical facility, with the sum of the products of the protection elements with associated facility-specific weighting factors and facility-specific quality factors of the technical facility in relation to the first dimension, and populating the two-dimensional table with the sum of the products of the risk elements with associated weighting factors and quality factors of the technical facility in relation to the second dimension, and determining that the at least one risk analysis value and/or facility optimization value on the basis of location of an entry in the two-dimensional table;

wherein the two-dimensional table is normalized by a facility-risk-specific normalization factor for determining the risk analysis values and/or facility optimization values for a technical facility.

7. The method as claimed in claim 6, further comprising:

generating and storing, in a memory module, at least two facility risk types, the facility risk types including at least one risk element and/or one protection element, each technical facility being allocated to one facility risk type; and generating, at a normalization module, a reference value for each facility risk type;

normalizing, via the normalization module, the facility data of different technical facilities based on the reference value of the associated facility risk type.

8. The method as claimed in claim 7, wherein the facility risk types and/or the associated reference values are generated dynamically.

9. The method as claimed in claim 7, wherein the facility risk types are generated such that a technical facility is unambiguously allocated in each case to one facility risk type.

10. The method as claimed in claim 6, wherein the two-dimensional table is divided into predefinable sectors, each sector corresponding to at least one definable risk analysis value and/or facility optimization value.

11. The method as claimed in claim 6, wherein the facility-risk-specific normalization factor is generated dynamically based on available facility data of technical facilities of the corresponding facility risk type.

12. The method as claimed in claim 6, wherein a scale of the first and/or second dimension of the table is linearly selected.

13. The method as claimed in claim 6, wherein a scale of the first and/or second dimension of the table is nonlinearly selected.

14. The method as claimed in claim 6, wherein the risk analysis values and/or facility optimization values for possible combinations and weightings of the protection elements and/or risk elements are generated automatically and stored so as to be accessible to a user via an extrapolation module.

15. The method as claimed in claim 6, wherein the evaluation module allocates a group risk factor to each facility risk type, the group risk factor identifying an overall risk of all technical facilities of a facility risk type.

16. The method as claimed in claim 6, wherein the group risk factor is generated dynamically by the evaluation module.

17. The method as claimed in claim 6, wherein the capture module is configured accessible via a decentralized network.

18. The method as claimed in claim 6, wherein the evaluation module forms groups of protection elements as knock-out protection elements with one or more protection elements, a knock-out protection element determining behavior of an entire group when a given limit value of a knock-out protection element is reached.

* * * * *